US008886923B1

(12) United States Patent
Breau et al.

(10) Patent No.: US 8,886,923 B1
(45) Date of Patent: *Nov. 11, 2014

(54) METHODS AND SYSTEMS FOR SECURE MOBILE-IP TRAFFIC TRAVERSING NETWORK ADDRESS TRANSLATION

(75) Inventors: Jeremy R. Breau, Kansas City, MO (US); Ray R. Doerr, Gardner, KS (US); Dan Durig, Olathe, KS (US); Robert C. Lamb, Blue Springs, MO (US); Arun Santharam, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 823 days.

This patent is subject to a terminal disclaimer.

(21) Appl. No.: 12/556,724

(22) Filed: Sep. 10, 2009

Related U.S. Application Data (63) Continuation of application No. 11/415,317, filed on May 1, 2006, now Pat. No. 7,606,191.

(51) Int. Cl.
*H04L 29/06* (2006.01)
*H04L 12/00* (2006.01)
*H04L 12/46* (2006.01)
*H04W 12/00* (2009.01)
*H04W 80/04* (2009.01)
*H04W 60/00* (2009.01)

(52) U.S. Cl.
CPC ............. *H04L 12/00* (2013.01); *H04L 12/4641* (2013.01); *H04W 12/00* (2013.01); *H04W 80/04* (2013.01); *H04W 60/00* (2013.01); *H04L 63/0272* (2013.01)
USPC ............................ 713/100; 713/150; 380/247

(58) Field of Classification Search
CPC .......... H04L 12/4641; H04L 63/0272; H04W 60/00; H04W 12/00; H04W 80/04
USPC .......... 380/247, 255; 713/1, 100, 150; 726/11
See application file for complete search history.

(56) References Cited

U.S. PATENT DOCUMENTS

| 7,269,173 | B2 | 9/2007 | Iyer et al. |
| 7,298,702 | B1 | 11/2007 | Jones et al. |
| 7,388,844 | B1 | 6/2008 | Brown et al. |
| 7,509,490 | B1 * | 3/2009 | Hsu et al. ....................... 713/162 |

(Continued)

OTHER PUBLICATIONS

"Welcome to Your Freedom" by www.your-freedom.net (Apr. 2006); 1 page; converted snapshot to PDF of http://www.your-freedom.net/ via http://www.archive.org/.*

(Continued)

*Primary Examiner* — Catherine Thiaw
*Assistant Examiner* — Don Zhao (57) ABSTRACT

Methods and systems are provided for secure Mobile-IP traffic traversing network address translation (NAT). A virtual-private-network (VPN) tunnel extending between the mobile node and the home agent is established, wherein the home agent comprises a VPN function. Establishing the VPN tunnel comprises (i) the mobile node communicating with the home agent at a public address of the home agent via a private network, a NAT device, and a public network and (ii) the home agent assigning the mobile node a first public address. The mobile node is registered with the home agent. Registering the mobile node comprises (i) the mobile node communicating via the VPN tunnel with the home agent at the public address of the home agent and (ii) establishing the first public address as a home address for the mobile node for, for example, purposes of Mobile-IP communication.

19 Claims, 5 Drawing Sheets

(56) References Cited

U.S. PATENT DOCUMENTS

| | | | | |
|---|---|---|---|---|
| 7,606,191 | B1* | 10/2009 | Breau et al. | 370/328 |
| 7,747,251 | B1* | 6/2010 | Pippert et al. | 455/432.1 |
| 2004/0078600 | A1* | 4/2004 | Nilsen et al. | 713/201 |
| 2004/0266420 | A1* | 12/2004 | Malinen et al. | 455/421 |
| 2005/0013280 | A1 | 1/2005 | Buddhikot et al. | |
| 2005/0073964 | A1* | 4/2005 | Schmidt et al. | 370/260 |
| 2005/0102529 | A1* | 5/2005 | Buddhikot et al. | 713/200 |
| 2005/0177647 | A1 | 8/2005 | Anantha et al. | |
| 2005/0195780 | A1* | 9/2005 | Haverinen et al. | 370/338 |
| 2005/0286504 | A1* | 12/2005 | Kwon | 370/356 |
| 2006/0126645 | A1 | 6/2006 | Devarapalli et al. | |
| 2007/0008980 | A1* | 1/2007 | Dommety et al. | 370/395.52 |
| 2007/0189250 | A1 | 8/2007 | Haddad et al. | |

OTHER PUBLICATIONS

"Anonymizer Total Net Shield" by Anonymizer (Apr. 2006); 1 page; converted snapshot to PDF of http://www.anonymizer.com/consumer/products/total_net_shield/ via http://www.archive.org/.*

"Anonymouse AnonWWW" by Anonymouse (Apr. 2006); 1 page; converted snapshot to PDF of http://anonymouse.org/anonwww.html via http://www.archive.org/.*

"Anonymous browsing input needed (SSL VPN)" by Gardens Cure (Mar. 28, 2006); 3 pages; converted to PDF originally from http://www.gardenscure.com/420/security/90682-anonymous-browsing-input-needed-ssl-vpn.html.*

"Google Anonymous Proxy" by TWOFORTYEIGHTAM (Oct. 17, 2005); 3 pages; converted to PDF originally from http://www.248am.com/mark/internet/google-anonymous-proxy/.*

"Protection of Privacy on the Internet" by Java Anonymous Proxy (Apr. 2006); 2 pages; converted snapshot to PDF of http://anon.inf.tu-dresden.de/index_en.html via http://www.archive.org/.*

"Netgear FVG318 ProSafe 8-port Wireless Firewall" by Broadband DSL Reports (Oct. 25, 2005); 3 pages; converted to PDF originally from http://www.dslreports.com/forum/remark,14658999.*

"Reference Manual for the ProSafe VPN Firewall FVS114" by Netgear (Apr. 2005); 212 pages (relevant pages included); originally downloaded from http://kbserver.netgear.com/pdf/fvs114_ref_manual_29Apr05.pdf.*

Rekhter, Y. et al., Address Allocation for Private Internets, Network Working Group, Request for Comments: 1918, Feb. 1996.

Kent, S. and Atkinson, R., Security Architecture for the Internet Protocol, Network Working Group, Request for Comments: 2401, Nov. 1998.

Kent, S. and Atkinson, R., IP Encapsulating Security Payload (ESP), Network Working Group, Request for Comments: 2406, Nov. 1998.

Harkins, D. and Carrel, D., The Internet Key Exchange (IKE), Network Working Group, Request for Comments: 2409, Nov. 1998.

Srisuresh, P. and Holdrege, M., IP Network Address Translator (NAT) Terminology and Considerations, Network Working Group, Request for Comments: 2663, Aug. 1999.

Srisuresh, P. and Egevang, K., Traditional IP Network Address Translator (Traditional NAT), Network Working Group, Request for Comments: 3022, Jan. 2001.

Perkins, C., IP Mobility Support for IPv4, Network Working Group, Request for Comments: 3344, Aug. 2002.

Levkowetz, H. and Vaarala, S., Mobile IP Traversal of Network Address Translation (NAT) Devices, Network Working Group, Request for Comments: 3519, Apr. 2003.

Aboba, B. and Dixon, W., IPsec-Network Address Translation (NAT) Compatibility Requirements, Network Working Group, Request for Comments: 3715, Mar. 2004.

Kivinen, T. et al., Negotiation of NAT-Traversal in the IKE, Network Working Group, Request for Comments: 3947, Jan. 2005.

Huttunen, A. et al., UDP Encapsulation of IPsec ESP Packets, Network Working Group, Request for Comments: 3948, Jan. 2005.

Syversen, J. and Kintigh, S., Wireless Security EE579R: Advanced Cryptography. 2001.

Gustafsson, E. et al., Requirements on Mobile IP from a Cellular Perspective, Mobile IP Working Group, Internet-Draft, Feb. 1999.

Doug, Trying to VPN from private IP behind inaccessible router to home network, www.usenet.com, Dec. 2, 2003.

Vpn over cdma 1x network?, www.rimweb.com, Aug. 21, 2004-Aug. 24, 2004.

Unpublished U.S. Appl. No. 10/327,427, entitled "Method and System for Providing Multiple Connections from a Common Wireless Access Point," filed Dec. 20, 2002 in the name of Bryce A. Jones.

Unpublished U.S. Appl. No. 11/415,317, entitled "Methods and Systems for Secure Mobile-IP Traffic Traversing Network Address Translation," filed May 1, 2006 in the name of Breau et al.

* cited by examiner

METHODS AND SYSTEMS FOR SECURE MOBILE-IP TRAFFIC TRAVERSING NETWORK ADDRESS TRANSLATION

CROSS REFERENCE TO RELATED APPLICATIONS

This application is a continuation of U.S. patent application Ser. No. 11/415,317, filed May 1, 2006, entitled "Methods and Systems for Secure Mobile-IP Traffic Traversing Network Address Translation," which is hereby incorporated herein by reference.

BACKGROUND

1. Technical Field

The present invention relates to packet-data communications and, more particularly, to improving the performance, reliability, and security of packet-data communications, including voice communications.

2. Description of Related Art a. Generally

More people than ever are using mobile stations, such as cell phones and personal digital assistants (PDAs), to connect to wireless wide area networks (WWANs), which are also referred to as cellular wireless communication systems, cellular wireless networks, and by other names. WWANs typically provide both voice and packet-data communication using a wireless communication format such as Code Division Multiple Access (CDMA), or another format.

In addition to WWANs, wireless local area networks (WLANs) are becoming increasingly popular. Typical WLANs cover an area that is geographically smaller than that covered by typical WWANs, and often provide a signal in that area that is superior to that provided by the WWAN. For example, a WLAN may cover a residence, a building, or a proximally-located group of buildings, perhaps on a corporate or academic campus.

WLANs typically provide a wireless coverage area and access to a packet-data network via one or more "access points." That packet-data network could operate according to the Internet Protocol (IP), and devices communicating over that network may each have an address known as an IP address. A common use of a WLAN is packet-data communication by a laptop computer, or perhaps by another device such as a digital video recorder. A commonly-used set of protocols for wireless communication between and among these access points and devices are those specified by the Institute of Electrical and Electronics Engineers (IEEE) 802.11 standards.

b. VoIP and Multi-Mode Devices

Recently, the telecommunications industry has witnessed widespread growth in the area of voice-over-IP (VoIP) technology; that growth, combined with the ever-increasing prevalence of mobile stations engaging in packet-data communication generally, has caused the industry to begin to introduce mobile stations ("multi-mode devices") that are equipped to engage in both (i) voice and packet communications via WWANs (using, e.g., CDMA) and (ii) packet-data communications (including VoIP communications) via WLANs (using, e.g., 802.11).

In one arrangement, for instance, a cellular wireless carrier may operate a gateway that provides connectivity between a packet-switched network and the wireless carrier's transport and signaling networks. The carrier may then distribute to its subscribers multi-mode devices, which may be capable of communicating in a WWAN mode with one or more types of WWANs and capable of communicating in a WLAN mode with one or more types of WLANs.

When a multi-mode device is within the coverage area of the carrier's WWAN infrastructure, the device may operate conventionally as a standard cellular telephone, with signaling passing through the carrier's signaling network and bearer data passing through the carrier's transport network. When the multi-mode device moves into the coverage area of a WLAN access point, on the other hand, the device may engage in IP-based signaling and IP-based bearer communication with the carrier's gateway, which may then interface the signaling and bearer communications with the carrier's signaling and transport networks.

c. Private Network Addressing

With respect to assigning IP addresses to devices communicating with each other over a typical WLAN, this is often done using what are known as private IP addresses. A private IP address is one that is routable over the network on which it is used, but not routable beyond that network. In fact, a device on one private network may have the exact same private IP address as another device on another private network. This illustrates why those private IP addresses are not routable in a global sense, or even beyond their own private networks. Relevant aspects of private network addressing are discussed in Rekhter et al., "Address Allocation for Private Internets," RFC 1918 (February 1996), which is incorporated herein by reference.

d. Network Address Translation

One method that has been developed to enable privately-addressed devices residing on private networks to communicate with devices on other networks is known as "network address translation (NAT). Relevant aspects of NAT are described in Srisuresh & Holdrege, "IP Network Address Translator (NAT) Terminology and Considerations," RFC 2663 (August 1999) and Srisuresh & Egevang, "Traditional IP Network Address Translator (Traditional NAT)," RFC 3022 (January 2001), which are incorporated herein by reference.

Typically, NAT involves a device (a "NAT device") that resides between the private network and another network, and that has a network address on both networks. As an example, the other network could be a public IP network such as the Internet. Note that NAT can also be performed between two private networks, or between two public networks. Returning to the example of one private network and one public network, when the NAT device receives an IP packet from a device on the private network that is addressed to a device on the public network, the NAT device changes the source IP address of the packet from the device's private address on the private network to the NAT device's public address on the public network.

However, since multiple privately-addressed devices may communicate over the public network via the NAT device, the NAT device must also keep track of which device sent the packet. One way the NAT device may do so is by selecting a transport-protocol port number for each device. As examples, the transport protocol could be the well-known User Datagram Protocol (UDP) or Transport Control Protocol (TCP). Thus, in addition to modifying the packet's source IP address, the NAT device may also modify a transport-protocol source port number for the packet, to identify the device on the private network.

When the NAT device receives an inbound packet, that inbound packet will typically have the NAT device's public address as the destination IP address and the port number previously chosen by the NAT device as the destination port number. The NAT device will thus be able to determine to which privately-addressed device to transmit the packet. The NAT device will then modify the inbound packet by changing the destination IP address from the NAT device's public IP address to the privately-addressed device's private IP address. The NAT device will typically also modify the inbound packet's destination port number to be equal to whatever source port number was originally used by the privately-addressed device. Note that a NAT device may have other ways of keeping track of privately-addressed devices.

e. Security Considerations and Protocols

Another important consideration in today's electronic-communication environment is the security of particular communications. Security measures commonly involve implementing authentication and encryption with respect to data transmissions. One well-known method of providing data-transmission security is known as the IP Security protocol suite, or IPSec. Relevant aspects of IPSec are discussed in Kent & Atkinson, "Security Architecture for the Internet Protocol," RFC 2401 (November 1998), which is incorporated herein by reference.

One well-known method of providing data encryption is known as the IP Encapsulating Security Payload, and is often abbreviated "ESP." Relevant aspects of ESP are described in Kent & Atkinson, "IP Encapsulating Security Payload (ESP)," RFC 2406 (November 1998), which is incorporated herein by reference. A methodology often employed in establishing and maintaining secure relationships between devices is known as the Internet Key Exchange (IKE), relevant aspects of which are described in Harkins & Carrel, "The Internet Key Exchange (IKE)," RFC 2409 (November 1998), which is incorporated herein by reference.

One term that is commonly used to describe a secure relationship between data-communication devices is a virtual private network (VPN) or VPN tunnel. Once a VPN tunnel is established between two or more communication devices, perhaps using the above-referenced security protocols, and/or perhaps other security and communication protocols, the devices can securely exchange packet data "inside" the VPN tunnel. Typically, this data would be encrypted using an encryption algorithm known to the devices connected via the VPN tunnel. The encrypted data would then be encapsulated with headers comprising IP addresses routable over the network or networks linking the devices. The data could then be decrypted on the receiving end according to the agreed-upon parameters of the VPN tunnel.

f. Security Implementations and Network Address Translation

Certain compatibility issues have arisen when attempts have been made to implement VPN tunnels (using, for example, IPSec) in contexts involving one or more NAT devices. One basic reason for the arising of these issues is that the VPN-tunnel implementations consider the modifications to the addresses and perhaps port numbers made by the one or more NAT devices to be an intolerable alteration to the packet data. These issues, as well as approaches to dealing with them, are discussed in Aboba & Dixon, "IPsec-Network Address Translation (NAT) Compatibility Requirements," RFC 3715 (March 2004), Kivinen et al., "Negotiation of NAT-Traversal in the IKE," RFC 3947 (January 2005), and Huttunen et al., "UDP Encapsulation of IPsec ESP Packets," RFC 3948 (January 2005), which are incorporated herein by reference.

g. Mobile IP

Many communication devices in today's environment implement a mobility protocol known as the Mobile Internet Protocol (Mobile IP), relevant aspects of which are discussed in Perkins, "IP Mobility Support for IPv4," RFC 3344 (August 2002), which is incorporated herein by reference. In Mobile IP, devices (known as "mobile nodes") are able to maintain a static or at least semi-permanent IP address even when changing their point of attachment to the Internet. This IP address is known with respect to the mobile node as a home address.

To maintain the ability to engage in IP communication even when changing its point of attachment to the Internet, a mobile node registers with a device known as a home agent, which resides on a network known with respect to the mobile node as a "home network." As a result of this registration, the home agent stores an association between the mobile node's home address and a "care-of address" for the mobile node. Packets addressed to the mobile node's home address are intercepted by the home agent on the home network and tunneled by the home agent to the mobile node's registered care-of address.

This care-of address could be a "co-located care-of address" or a "foreign-agent care-of address." If the care-of address is a co-located care-of address, that address would typically be an address of the mobile node on the network to which the mobile node is currently attached. If the care-of address is a foreign-agent care-of address, that address would typically be an IP address of a separate device on the network to which the mobile node is currently attached. That device and network would be known to the mobile node as a foreign agent and a foreign network, respectively. The foreign agent would receive packets tunneled from the home agent, and forward those packets to the mobile node. The foreign agent could also tunnel outgoing packets from the mobile node to the home agent.

h. Mobile IP and Network Address Translation

One or more NAT devices could be present between a mobile node and its home agent, which creates a number of compatibility issues. Some of these issues, as well as an approach to handling them, are discussed in Levkowetz & Vaarala, "Mobile IP Traversal of Network Address Translation (NAT) Devices," RFC 3519 (April 2003), which is incorporated herein by reference. The basic problem has been routing of packets to the correct mobile node, when those packets pass through a NAT device. The basic solution described in RFC 3519 involves use of a particular UDP port that the NAT device can use to map to the correct mobile node.

i. Conclusion

In the context of a service provider providing packet-data service to customers, certain additional considerations arise as well. For example, service providers can typically obtain only a limited number of public IP addresses from the various Internet registries such as Internic. As such, it is important to a typical service provider to use those addresses as efficiently as possible.

Also, for security reasons, service providers typically prefer that certain of their network entities not be directly accessible via a public Internet address. Rather, the service providers prefer to "hide" these entities behind publicly-addressed devices such as gateways. Some examples of network entities about which a typical service provider may have such a preference are Session Initiation Protocol (SIP) servers, Real-time Transport Protocol (RTP) servers, and Wireless Application Protocol (WAP) gateways.

A third consideration is that, especially in the context of packet-data-communication applications such as VoIP, performance is greatly enhanced by keeping the percentage of each packet that is made up of user data (rather than meta-data such as headers) as high as possible.

In summary, none of the current proposals for handling the various intersections of the various technologies mentioned above (Mobile IP, NAT, security/privacy tools, etc.) adequately achieve Mobile-IP registration and Mobile-IP VoIP communication in a secure, private manner, in a way that reliably traverses NAT, conserves a service provider's publicly-routable address space, guards as many service-provider network entities as possible from having to be publicly accessible via the Internet, and maximizes the percentage of user data per packet.

Overview

As presently contemplated, a mobile node capable of engaging in packet-data communication will first connect to a private IP network. As an example, the mobile node could be a multi-mode device and the private IP network could be a WLAN. The mobile node may detect an access point in the WLAN and connect to that access point. The mobile node may then send a request, such as a Dynamic Host Configuration Protocol (DHCP) request, for an IP address on the private WLAN to the access point. The access point may responsively transmit a DHCP response to the mobile node. The DHCP response may include a private IP address routable on the private WLAN that the access point has assigned to the mobile node. The mobile node may then configure itself to operate on the private network using the assigned address. That private IP address could also be statically provisioned in to the mobile node.

The mobile node then establishes a VPN tunnel with the mobile node's home agent. The home agent may reside on a public IP network such as the Internet and thus have a public IP address. The home agent also includes a VPN function to facilitate establishment of the VPN tunnel extending between the mobile node and the home agent. Thus, the mobile node may transmit a request, such as an IKE request, to the home agent via the private network, the access point, and the public network to the home agent at the home agent's public IP address. This home-agent public address could have been previously provisioned into the mobile node.

Note that the access point in this scenario is a NAT device, and will be referred to as such herein. In exemplary embodiments, the NAT device has both a private IP address routable on the private network and a public IP address routable on the public network. Note that some NAT devices may have a public IP address routable on a first public network and a second public IP address routable on a second public network, and perform NAT functions between those two networks. Note also that the terms "private" and "public"—when used in the context of IP addresses and IP networks—may refer to IP routing (as in RFC 1918) and/or economic ownership and control (such as a particular company maintaining a "private" corporate network), even though some devices on that network could be publicly addressable in the IP-routing sense.

The mobile node may encapsulate the IKE request with network and transport-layer headers that the NAT device may modify as described above to facilitate the communication. Following such modification, the NAT device forwards the request over the public network to the home agent. The home agent and the mobile node may then negotiate various parameters of the VPN tunnel as part of establishing that VPN tunnel. This negotiation may include the home agent transmitting at least one IKE response to the mobile node via the public network, the NAT device, and the private network. Once the VPN tunnel has been established, the mobile node and the home agent may exchange encrypted packets inside this tunnel.

Also as part of establishing the VPN tunnel, or perhaps once it has been established, the mobile node may request a public IP address from the home agent. In response to that request, the home agent may then assign to the mobile node one of the publicly-routable IP addresses that has been allocated to the service provider operating that home agent.

Next, the mobile node conducts a Mobile-IP registration with the home agent inside the VPN tunnel. That is, the Mobile-IP registration involves the mobile node and the home agent exchanging encrypted messages inside the tunnel. During this process, the mobile node may generate a Mobile-IP registration request, encrypt that registration request according to the agreed-upon parameters of the VPN tunnel, and then encapsulate that encrypted registration request with a transport-protocol header such as a UDP header, as well as an outer IP header having the mobile node's private IP address on the private WLAN as a source address and the home agent's public IP address on the public network as the destination address.

Note that the mobile node preferably operates in what is known as "co-location mode," in which the mobile node does not wait for agent advertisement messages from one or more foreign agents; rather, the mobile node proactively contacts its home agent to facilitate the Mobile-IP registration process. The mobile node may indicate to its home agent that the mobile node is operating in this mode by setting one or more bits in a registration request.

The mobile node may then transmit this assembled packet via the private WLAN to the NAT device. The NAT device may then modify the packet by changing the source UDP port to a value chosen, perhaps randomly, by the NAT device. The NAT device may also modify the packet by changing the source address of the outer header to the NAT device's public address on the public network. The NAT device may then forward the modified, encapsulated, encrypted registration request to the home agent via the public network.

Upon receipt of this registration request, the home agent may strip off the outer IP header and the transport-protocol header, decrypt the registration request, and then process it. This registration request may include the public IP address that the home agent had earlier assigned to the mobile node during or following the establishment of the VPN tunnel. The home agent may then store an association between that public address and the public address of the NAT device.

The home agent may then construct a Mobile-IP registration response, encrypt that response according to the VPN tunnel, and encapsulate that encrypted registration response using a transport-protocol header and an outer IP header. The transport-protocol header would have a destination port equal to the value chosen earlier by the NAT device, and the outer IP header would have a source address equal to the home agent's public IP address and a destination address equal to the NAT device's public IP address. The home agent would then forward this encapsulated, encrypted registration response over the public network to the NAT device.

This process of the mobile node registering with the home agent results in the public IP address—that was assigned by the home agent to the mobile node as part of the process of establishing the VPN tunnel between the mobile node and the home agent—being established as the mobile node's home address for purposes of Mobile-IP communication. Thus, the mobile node is now capable of engaging in secure, private, NAT-traversing Mobile-IP communication.

When the mobile node thereafter wishes to transmit data, the mobile node will first package that data in an outbound inner packet having a source address equal to the mobile node's home address and a destination address equal to whatever device to which the mobile node desires to send the packet. For purposes of this discussion, that device will be referred to as a "corresponding node." The corresponding node could be a publicly-accessible device, having a publicly-routable IP address on the public network (e.g., the Internet).

However, the corresponding node could just as well be a device having a private IP address of its own on the service-provider's network. In this case, the home agent may, in addition to having the aforementioned public IP address on the public network, also reside on a private network maintained by the service provider. This could correspond to a situation in which the service provider wishes to hide, for example, a SIP server (such as or including a SIP proxy) behind the publicly-addressed home agent.

The mobile node may then encrypt the packet according to the terms of the VPN tunnel, and then encapsulate that encrypted packet with (i) a UDP header having a source port equal to a first value and (ii) an outbound outer IP header having a source address equal to the mobile node's private address on the private WLAN and a destination address equal to the home agent's public IP address on the public network. The mobile node may then transmit that assembled outbound packet via the private WLAN to the NAT device. In exemplary embodiments where the mobile node is using ESP to accomplish secure encapsulation, the mobile node would be doing so in what is known with respect to ESP as "tunnel mode," in that the encrypted portion of the packet includes a packet having its own source and destination addresses.

Upon receipt of that outbound packet, the NAT device may modify the outbound packet by (i) changing the source UDP port of the transport-protocol header to be equal to a second value and (ii) changing the source IP address of the outer header to be equal to the public IP address of the NAT device. The NAT device may then forward the modified outbound packet to the home agent's public IP address over the public network.

Upon receipt of the modified outbound packet, the home agent may strip off the outer IP header and the transport-protocol header, decrypt the inner packet, and process that inner packet. Processing the inner packet may involve processing the data contained in the inner packet, such as by forwarding the packet to the corresponding node via either the public network or the service provider's network, whichever is indicated by the destination address of the inner packet.

Similarly, the home agent may receive a packet over either the public network or the service-provider network having a source IP address equal to the address of the corresponding node and a destination address equal to the publicly-routable and previously-assigned-and-registered home address of the mobile node. The home agent may responsively encrypt that packet according to the parameters of the VPN tunnel, and add (i) a transport-protocol header having a destination port equal to the value previously selected by the NAT device and (ii) an outer IP header having a source IP address equal to the public address of the home agent and a destination address equal to the public address of the NAT device. The home agent may then transmit that assembled packet over the public network to the NAT device.

Upon receipt of the inbound packet from the home agent, the NAT device may change the destination port value of the transport header to be equal to the value originally used by the mobile node, and change the destination IP address of the packet from the NAT device's public IP address to the mobile node's private IP address on the WLAN. The NAT device may then forward the modified inbound packet over the private WLAN to the mobile node.

Upon receipt of the modified inbound packet from the NAT device, the mobile node may strip off the outer IP header and the transport-protocol header, decrypt the inner packet according to the parameters of the VPN tunnel, and then process the inner IP packet. In this manner, the mobile node may thus receive the packet that the corresponding node transmitted to the mobile node's home address, by way of the home agent, the NAT device, and the VPN tunnel.

By co-locating the Mobile-IP home-agent function and the VPN-tunnel-endpoint function in the home agent that uses the single public IP address, and by establishing as the mobile node's Mobile-IP home address the publicly-routable IP address that the home agent assigned to the mobile node as part of establishing (or following establishment of) the VPN tunnel, at least one important benefit is achieved over the scattered and incomplete proposals in the prior art.

That advantage is that more user data (such as VoIP voice data) can be transmitted per packet. The reason for this is that the packets do not need to include separate headers for (i) communication between the mobile node's Mobile-IP home address and an address of the Mobile-IP home agent and (ii) communication between the mobile node as a VPN endpoint (at an address that would be different from the Mobile-IP home address) and a VPN-tunnel terminator (separate and distinct from the mobile node's home agent and thus having an address different from the home agent's public IP address). Less headers, more data. In a context such as VoIP, this is critical to providing users with a more satisfactory experience, and to facilitating more simultaneous VoIP sessions via a single wireless access point/NAT device.

This addressing scheme also conserves the limited supply of public IP addresses that the service provider can assign to devices, as well as the limited IPv4 address space generally. In addition, the service provider may advantageously shield devices such as SIP servers, RTP servers, and WAP gateways from being publicly accessible via the Internet, since all packet data to and from the mobile node is sent inside the VPN tunnel via the home agent. This will result in those devices operating in a more secure manner that is less vulnerable to attacks.

And that advantage does not come at the expense of other important considerations. For example, both the Mobile-IP registration and the ensuing Mobile-IP data communication is conducted in a secure, private manner, since the VPN tunnel provides encrypted communication between the mobile node and the home agent. Privacy is further enhanced in that packets sent by the mobile node to devices out on the Internet will appear to emanate only from the mobile node's home address on its home network, giving no indication of where the mobile node is or to what network it is connected.

Also, the mobile node will only be visible and accessible to the default gateway on the particular subnet to which it is attached. Other nodes on that subnet—such as other Mobile-IP users at a Wi-Fi hotspot (such as at a coffee shop or airport)—will not be able to determine that the mobile node is connected to the same subnet. Furthermore, the present invention can handle an arbitrary number of NAT devices situated between the mobile node and the home agent.

Furthermore, compatibility issues between IPSec and NAT, as well as between Mobile IP and NAT, are addressed. Basically, the packets sent according to the principles described herein achieve secure Mobile-IP communication that survives NAT. Since the inner Mobile-IP packets are inside the encrypted VPN tunnel, NAT has no impact on them. Also, since the NAT device is only modifying the outer IP header and transport-protocol header, the security protocols will not present the issues referenced above.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Exemplary Architecture a. Exemplary Communication System

Figure 1:
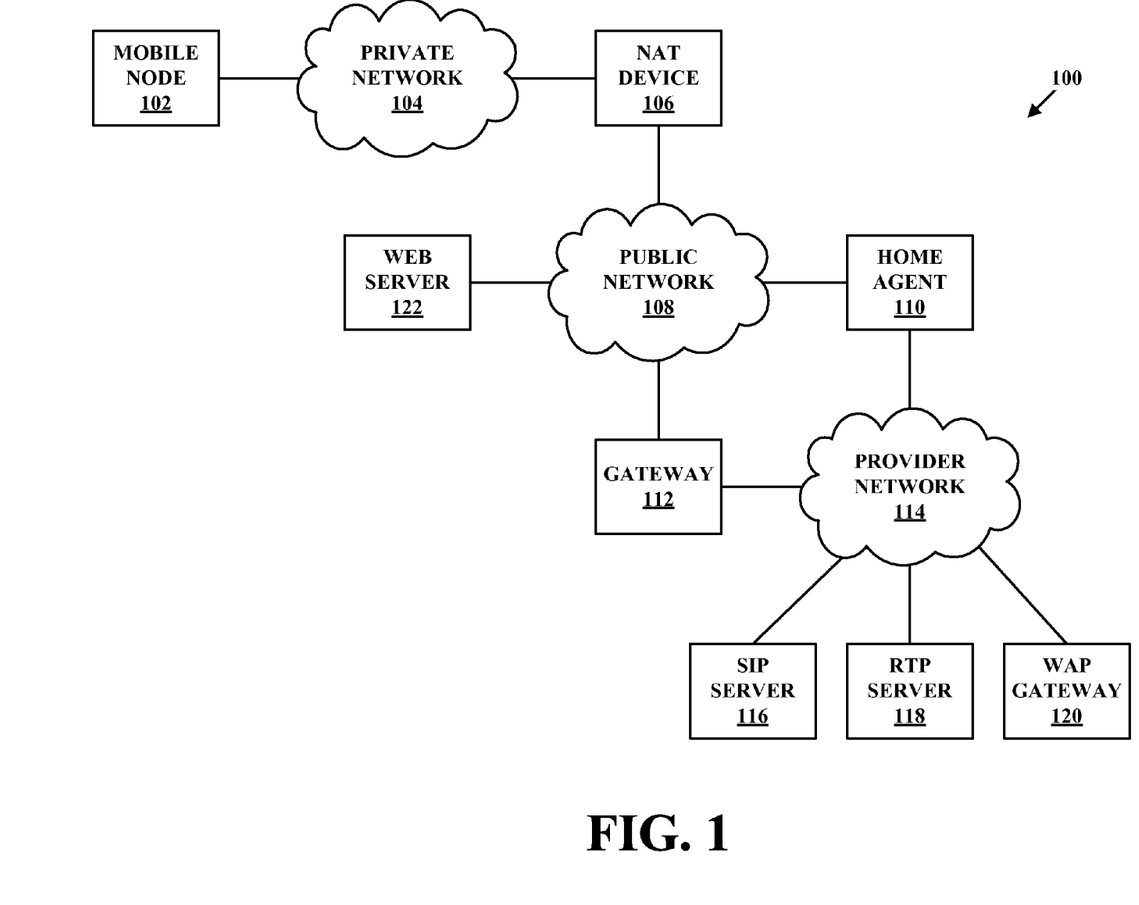
FIG. 1 is a simplified block diagram of an example of a communication system, in accordance with exemplary embodiments.

FIG. 1 is a simplified block diagram of an example of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes a mobile node 102, a private network 104, a NAT device 106, a public network 108, a home agent 110, a gateway 112, a provider network 114, a SIP server 116, an RTP server 118, a WAP gateway 120, and a web server 122. It should be understood that any number of entities not shown in FIG. 1 could be present as well. For example, there could be any number of mobile nodes and other devices in communication with private network 104, public network 108, and/or provider network 114. Furthermore, there could be any number of intermediate devices and networks making up all or part of any of the communication links. For example, there could be one or more routers or other devices on the communication link between NAT device 106 and public network 108.

Figure 2:
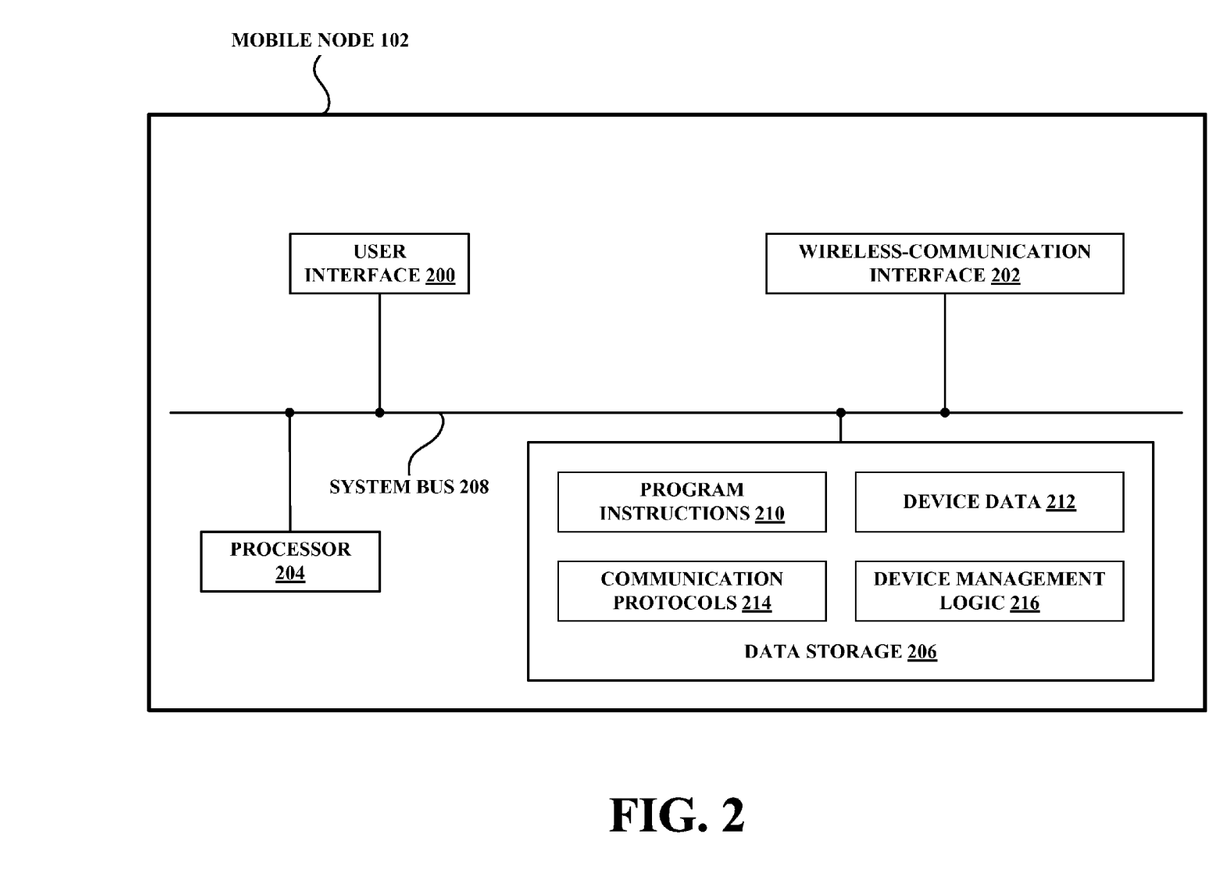
FIG. 2 is a simplified block diagram of an exemplary mobile node, which may be used in accordance with exemplary embodiments.

Mobile node 102 is described more fully in connection with FIG. 2, but may in general be any mobile device capable of connecting to one or more packet-data networks and engaging in packet-data communications via those networks, and of carrying out the mobile-node functions described herein. As examples, mobile node 102 could be a cellular telephone, a PDA, a laptop computer, a multi-mode device, or some other type of communication device. In the case of mobile node 102 being a multi-mode device, mobile node 102 may be able to communicate with one or more WWANs using a protocol such as CDMA and with one or more WLANs using a protocol such as IEEE 802.11.

Private network 104 may be a packet-data network over which devices such as mobile node 102 and NAT device 106 send and receive packet data. Private network 104 may include one or more wireless networks and/or one or more wired networks. In some embodiments, private network 104 may be a single WLAN administered by a single wireless access point, with which other devices on private network 104 communicate using a wireless protocol such as IEEE 802.11. Devices communicating over private network 104 may each have a private IP address routable on private network 104 but not on public network 108.

As one example, the wireless protocol could be IEEE 802.11g, as described in "IEEE Standard for Information Technology, Telecommunications and Information Exchange Between Systems, Local and Metropolitan Area Networks, Specific Requirements, Part 11: Wireless LAN Medium Access Control (MAC) and Physical Layer (PHY) Specifications, Amendment 4: Further Higher Data Rate Extension in the 2.4 GHz Band," published June 2003, which is incorporated herein by reference. The use of 802.11g is exemplary; other 802.11 standards and other wireless protocols (such as Bluetooth, HiperLAN, Multichannel Multipoint Distribution Service (MMDS), and HomeRF) could be used as well. Private network 104 may be communicatively coupled with at least mobile node 102 and NAT device 106.

Figure 3:
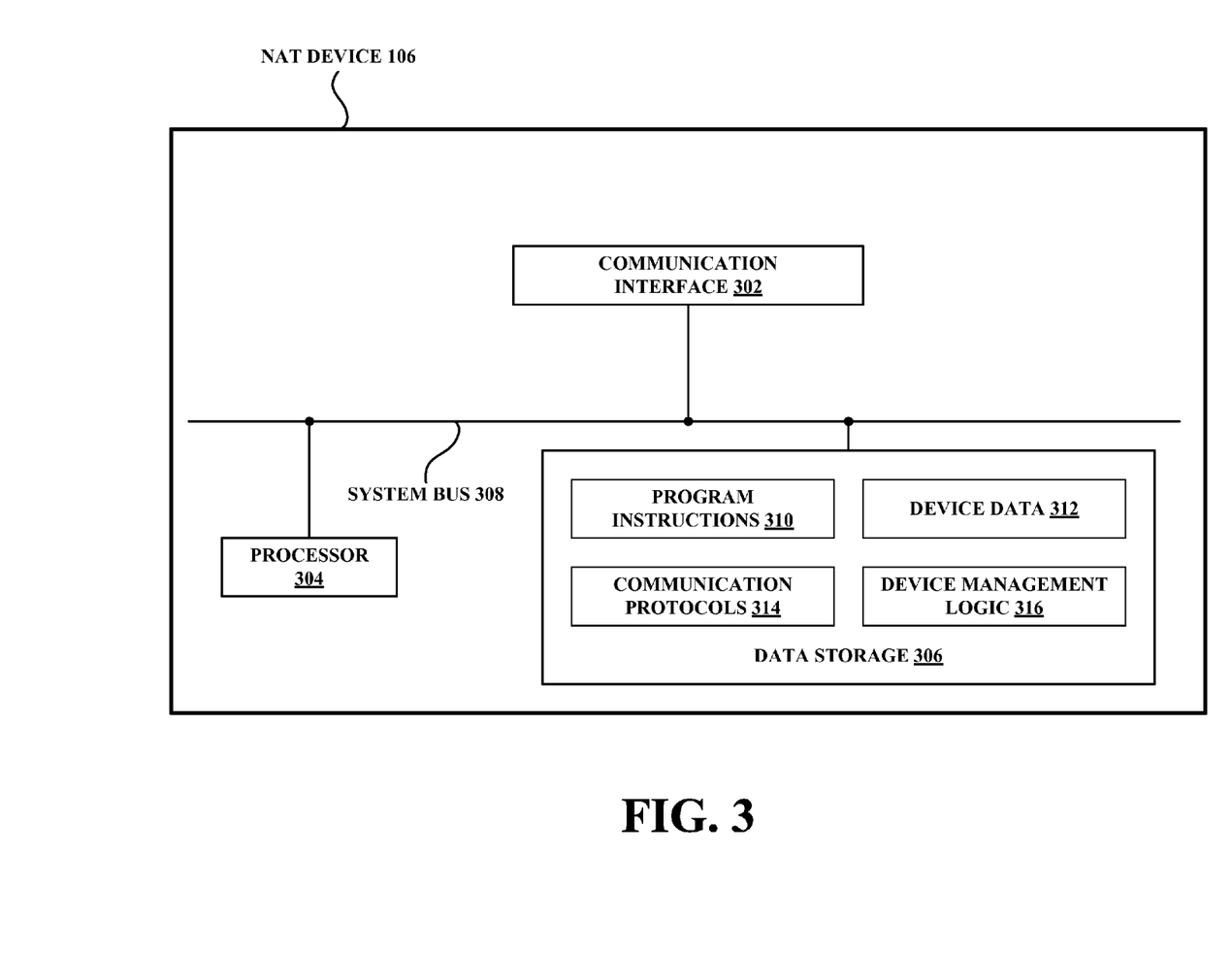
FIG. 3 is a simplified block diagram of an exemplary network address translation (NAT) device, which may be used in accordance with exemplary embodiments.

NAT device 106 is described more fully in connection with FIG. 3, but may in general be any communication device arranged to carry out the NAT-device functions described herein. As such, NAT device 106 may include a wireless and/or wired packet-data communication interface, a processor, and data storage comprising program instructions. NAT device 106 serves primarily two functions in the exemplary embodiments: administration of private network 104, and network address translation to facilitate communication between privately-addressed devices residing on private network 104 and devices residing on other networks. As such, NAT device 106 may include a DHCP server, packet-forwarding capabilities, and NAT functionality. NAT device 106 may be communicatively coupled with at least private network 104 and public network 108, and thus may have a private network address routable on private network 104 and a public network address routable on public network 108.

Public network 108 may be communicatively coupled with at least NAT device 106, home agent 110, gateway 112, and web server 122, and may include one or more wide area networks, one or more local area networks, one or more public networks such as the Internet, one or more private networks, one or more wired networks, and/or one or more wireless networks. Devices in communication with public network 108 (and, for that matter, private network 104 and/or provider network 114) may exchange data using a packet-switched protocol such as IP, and may be identified by an address such as an IP address. In the case of public network 108, those addresses would be public addresses routable over public network 108.

Figure 4:
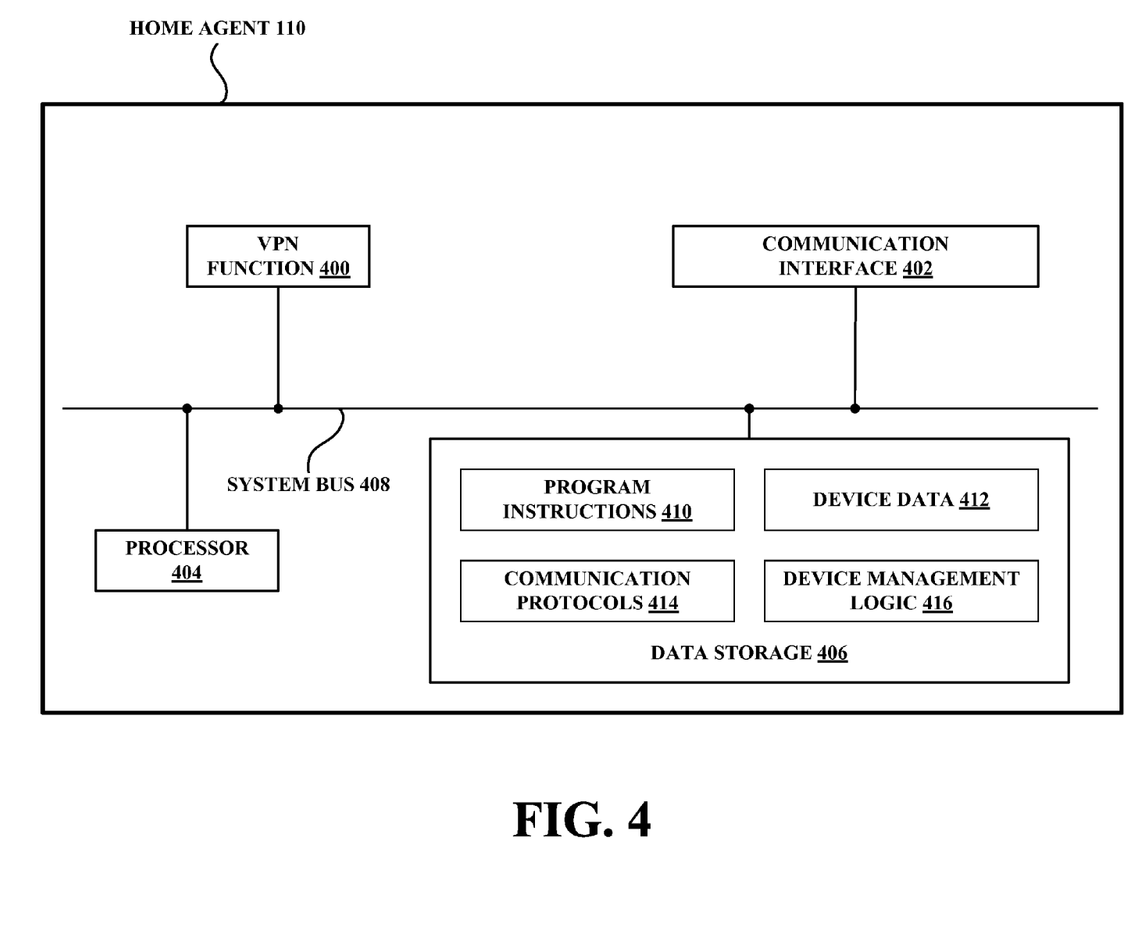
FIG. 4 is a simplified block diagram of an exemplary home agent, which may be used in accordance with exemplary embodiments.

Home agent 110 is described more fully in connection with FIG. 4, but may in general be any communications device arranged to communicate over public network 108 and perhaps one or more additional networks such as provider network 114, and to carry out the home-agent functions described herein. As such, home agent 110 may take the form of a network server or packet data serving node having a wireless and/or wired communication interface, a processor, and data storage comprising program instructions. Home agent 110 may be communicatively coupled to at least public network 108 and provider network 114, and may have a public IP address routable over public network 108 and a private IP address routable over provider network 114. Home agent 110 may comprise a VPN function for carrying out the VPN-related home-agent functions described herein, as well as Mobile-IP functionality for carrying out the Mobile-IP-related home-agent functions described herein.

Gateway 112, SIP server 116, RTP server 118, WAP gateway 120, and web server 122 may take the form of network servers, each having a communication interface for communicating over the respective networks to which they are depicted as being connected in FIG. 1, as well as IP addresses routable on the appropriate networks. It should be noted as well that, while devices are herein described as having one or more IP addresses, the actual value of one or more of those IP addresses could dynamically change due to the normal operation of an address-allocation and host-configuration protocol such as DHCP.

The various network servers described in the preceding paragraph may each comprise functional components and/or program instructions suited to their particular tasks. For example, web server 122 may comprise a HyperText Transfer Protocol (HTTP) server, while SIP server 116 may comprise program instructions related to receiving and serving SIP-related functions, as is known in the art, and so on. In some implementations, some of these devices may not be present. In other implementations, other devices serving other functions may be present. As one example, gateway 112 may not be present in some implementations, and is depicted generally to illustrate that links between public network 108 and provider network 114 may exist other than that provided by home agent 110.

Provider network 114 may, similar to private network 104, be a private IP network, and be communicatively connected to at least home agent 110, gateway 112, SIP server 116, RTP server 118, and WAP gateway 120. Provider network 114 may be a private network operated by a service provider that provides packet-data service, and perhaps one or more other services, to mobile node 102. For example, the service provider may provide VoIP service, which may make use of SIP server 116 and RTP server 118 as is known in the art.

b. Exemplary Mobile Node

FIG. 2 is a simplified block diagram of an exemplary mobile node, which may be used in accordance with exemplary embodiments. In particular, FIG. 2 depicts mobile node 102 of FIG. 1. As shown in FIG. 2, mobile node 102 includes a user interface 200, a wireless-communication interface 202, a processor 204, and data storage 206, all of which may be communicatively linked by a system bus 208.

User interface 200 may include one or more mechanisms for receiving inputs from users, and one or more mechanisms for communicating outputs to users. Mobile-node user interfaces are known in the art, and thus are not described in detail here. Suffice it to say that user interface 200 may include buttons, a touch screen, a microphone, and any other mechanisms now known or later developed for receiving inputs, as well as an LCD or other display, speakers, and any other mechanisms now known or later developed for communicating outputs.

Wireless-communication interface 202 may include hardware and/or software that mobile node 102 may use to communicate via one or more WWANs, one or more WLANs, and/or one or more other types of networks. As such, wireless-communication interface 202 may include a chipset arranged to communicate with WWANs according to a protocol such as CDMA, a chipset arranged to communicate with WLANs according to a protocol such as IEEE 802.11, and/or one or more other types of wireless packet-data-communication interfaces. Wireless-communication interface 202 may interoperate with one or more antennas to facilitate wireless communication with one or more devices such as NAT device 106. Note that mobile node 102 could also comprise a wired Ethernet interface, configured to be physically connected to a wired network for packet-data communication.

Processor 204 may control many operations of mobile node 102 by executing a set of program instructions 210 stored in data storage 206, and may comprise multiple (e.g., parallel) processors, such as a general purpose microprocessor and/or a discrete digital signal processor.

Data storage 206 may store program instructions 210, device data 212, communication protocols 214, and device management logic 216. Data storage 206 may take various forms, in one or more parts, such as a non-volatile storage block and/or a removable storage medium. Program instructions 210 may be executable by processor 204 to carry out various mobile-node functions described herein. Device data 212 may include data such as a preferred roaming list (PRL) for mobile node 102, as well as any other type of data.

Communication protocols 214 may be useful to receive data from and send data to one or more devices described herein, and may include any of the protocols mentioned herein, as well as any other protocols now known or later developed. Compatible protocols may be stored in one or more devices with which mobile node 102 communicates. Device management logic 216 may be used to manage aspects of mobile node 102 such as memory and file management.

c. Exemplary NAT Device

FIG. 3 is a simplified block diagram of an exemplary network address translation (NAT) device, which may be used in accordance with exemplary embodiments. In particular, FIG. 3 depicts NAT device 106 of FIG. 1. As shown in FIG. 3, NAT device 106 includes a communication interface 302, a processor 304, and data storage 306, all of which may be communicatively linked by a system bus 308.

Communication interface 302 may include hardware and/or software that NAT device 106 may use to communicate via one or more packet-data networks, such as private network 104 and public network 108. As such, communication interface 302 may include a chipset arranged to communicate with other devices according to a protocol such as IEEE 802.11, a wired Ethernet interface, and/or one or more other types of packet-data-communication interfaces. Communication interface 302 may interoperate with one or more antennas to facilitate wireless communication with one or more devices such as mobile node 102. In addition, communication interface 302 may be associated with at least one private network address routable on private network 104 and at least one public address routable on public network 108.

Communication interface 302 may also include a network access device such as a cable modem communicatively connected with a hybrid cable/fiber network, to provide Internet access to devices communicating over private network 104. As such, communication interface 302 may include a port for connecting to coaxial cable. NAT device 106 may therefore include the ability to interface a packet-cable protocol such as DOCSIS with protocols such as Ethernet and IEEE 802.11. Other possibilities exist as well, such as communication interface including a Digital Subscriber Line (DSL) modem and port for a conventional telephone line.

Processor 304 may control many operations of NAT device 106 by executing a set of program instructions 310 stored in data storage 306, and may comprise multiple (e.g., parallel)

processors, such as a general purpose microprocessor and/or a discrete digital signal processor.

Data storage 306 may store program instructions 310, device data 312, communication protocols 314, and device management logic 316. Data storage 306 may take various forms, in one or more parts, such as a non-volatile storage block and/or a removable storage medium. Program instructions 310 may be executable by processor 304 to carry out various NAT-device functions described herein. Device data 312 may include data such as a DHCP client table, port numbers associated with devices on private network 104, as well as any other type of data.

Communication protocols 314 may be useful to receive data from and send data to one or more devices described herein, and may include any of the protocols mentioned herein, as well as any other protocols now known or later developed. Compatible protocols may be stored in one or more devices with which NAT device 106 communicates. Device management logic 316 may be used to manage aspects of NAT device 106 such as memory and file management.

d. Exemplary Home Agent

FIG. 4 is a simplified block diagram of an exemplary home agent, which may be used in accordance with exemplary embodiments. In particular, FIG. 4 depicts home agent 110 of FIG. 1. As shown in FIG. 4, home agent 110 includes a VPN function 400, a communication interface 402, a processor 404, and data storage 406, all of which may be communicatively linked by a system bus 408.

VPN function 400 may include any combination of hardware and/or software that home agent 110 may use to carry out the VPN-related home-agent functions described herein. As such, VPN function 400 may include one or more security protocols to aid in establishing a VPN tunnel with mobile nodes such as mobile node 102. For example, VPN function 400 may include IPSec functionality, ESP functionality, and/or IKE functionality. VPN function 400 may also include a DHCP server to assign public addresses to mobile nodes such as mobile node 102.

Communication interface 402 may include hardware and/or software that home agent 110 may use to communicate over one or more packet-data networks such as public network 108 and provider network 114. As such, communication interface 402 may be associated with at least one public address routable over public network 108 and at least one private address routable over provider network 114. Communication interface 402 may be configured to engage in both wired and/or wireless communication, and thus may include a chipset arranged to communicate according to a protocol such as IEEE 802.11, a wired Ethernet interface, and/or one or more other types of packet-data-communication interfaces. Communication interface 402 may make use of one or more antennas to facilitate wireless communication with one or more devices.

Processor 404 may control many operations of home agent 110 by executing a set of program instructions 410 stored in data storage 406, and may comprise multiple (e.g., parallel) processors, such as a general purpose microprocessor and/or a discrete digital signal processor.

Data storage 406 may store program instructions 410, device data 412, communication protocols 414, and device management logic 416. Data storage 406 may take various forms, in one or more parts, such as a non-volatile storage block and/or a removable storage medium. Program instructions 410 may be executable by processor 404 to carry out various home-agent functions described herein. Device data 412 may include data such as mobility bindings that associate various mobile nodes' home addresses with care-of addresses.

Communication protocols 414 may be useful to receive data from and send data to one or more devices described herein, and may include any of the protocols mentioned herein, as well as any other protocols now known or later developed. Compatible protocols may be stored in one or more devices with which home agent 110 communicates. Device management logic 416 may be used to manage aspects of home agent 110 such as memory and file management.

2. Exemplary Operation

Figure 5:
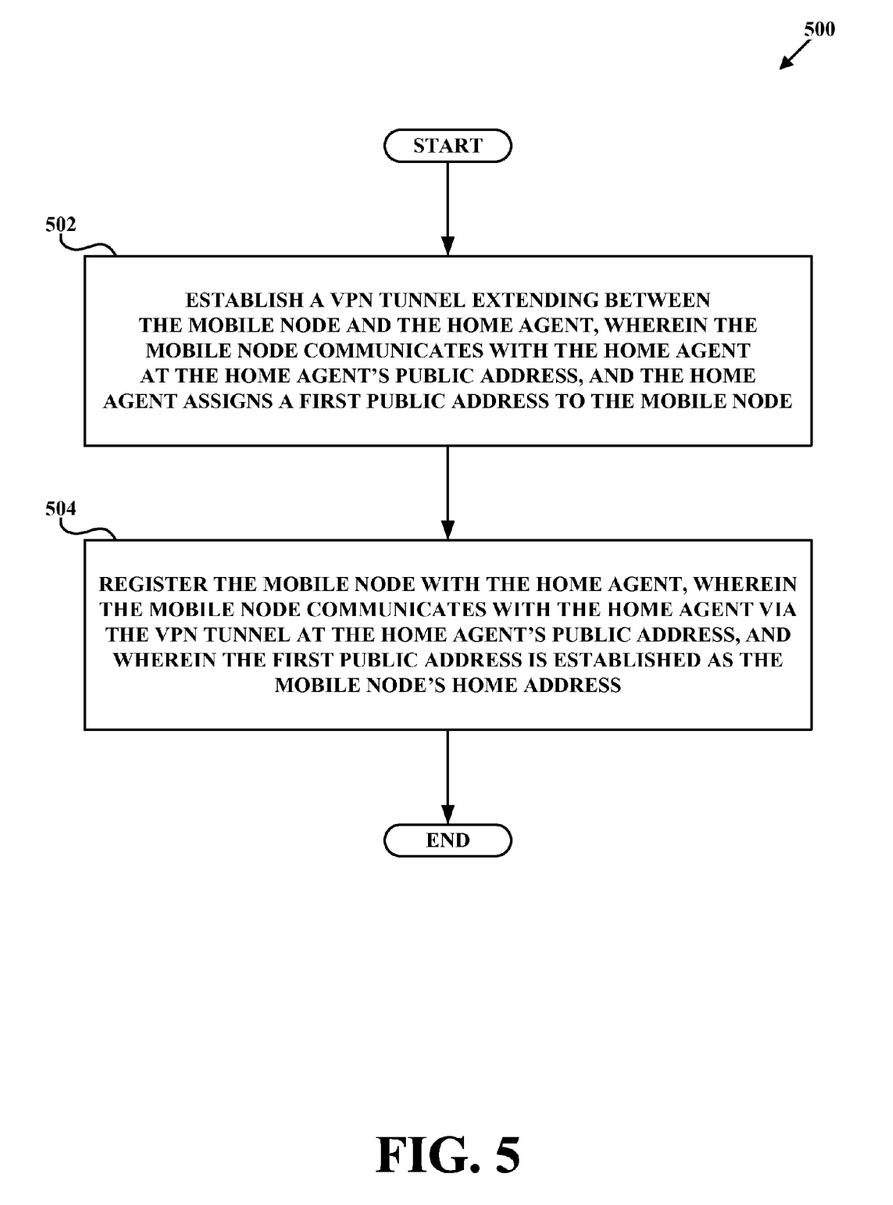
FIG. 5 is a flowchart of an exemplary embodiment, in the form of a method carried out along the communication system of FIG. 1.

FIG. 5 is a flowchart of an exemplary embodiment, in the form of a method carried out along the communication system of FIG. 1. As shown in FIG. 5, the method 500 begins at step 502, when a VPN tunnel extending between mobile node 102 and home agent 110 is established. At step 504, mobile node 102 is registered with home agent 110. These steps will be further explained in the following subsections.

a. Establishing the VPN Tunnel

At step 502, a VPN tunnel extending between mobile node 102 and home agent 110 is established. Step 502 involves mobile node 102 communicating with home agent 110 at the home agent's public IP address on public network 108. This address may have been provisioned into mobile node 102 by a service provider. As an example, this value could be stored in mobile node 102's memory, and could be updatable using over-the-air communications to mobile node 102, perhaps from a WWAN. As described above, home agent 110 may comprise a VPN function 400 to aid home agent 110 in participating in the establishment of the VPN tunnel. To establish the VPN tunnel, mobile node 102 communicates with home agent 110 via private network 104, NAT device 106, and public network 108.

As described above, mobile node 102 could be a multimode device, capable of, as examples, CDMA-based communication with one or more WWANs and 802.11-based communication with one or more WLANs. Also explained above was the possibility that private network 104 could be one such WLAN. In that scenario, NAT-device 106 may comprise wireless-access-point functionality, and mobile node 102 may communicate over private network 104 with NAT device 106 using a wireless protocol such as IEEE 802.11.

Prior to step 502, mobile node 102 may take steps to acquire a private network address routable on private network 104. Note in general that network 104 is described in an exemplary manner as being a private network, though the present invention could be implemented in a scenario where network 104 is public, either in the IP-routable or economic-ownership sense, or both. Returning to the example of network 104 being privately addressed, mobile node 102 may acquire this private network address in part by transmitting a DHCP request to NAT device 106 via private network 104. Mobile node 102 may thereafter receive a DHCP response from NAT device 106 via private network 104. That DHCP response may include the private address for mobile node 102. Alternatively, mobile node 102 could be configured to have a static private address on private network 104. This static address could be provisioned into mobile node 102.

As part of step 502, home agent 110 may assign to mobile node 102 a public IP address routable over public network 108. Home agent 110 may do so at the request of mobile node 102. For example, mobile node 102 may transmit an IKE request to home agent 110. Mobile node 102 may thereafter receive an IKE response from home agent 110. That IKE response may include the public IP address for mobile node 102 to use.

Other possibilities exist as well. For example, mobile node 102 and home agent 110 may exchange IKE messages to negotiate the parameters of the VPN tunnel, and thereafter mobile node 102 may transmit a DHCP request to home agent 110 inside that VPN tunnel. Home agent 110 may then transmit a DHCP response to mobile node 102 inside the VPN tunnel, where that DHCP response indicates to mobile node 102 a public IP address to use. Also, it should be noted that mobile node 102 may already know it's public IP address, and step 502 may in part confirm that the address mobile node 102 has stored is valid and recognized by home agent 110.

Regardless of the exact manner in which step 502 is carried out, the result is that mobile node 102 and home agent 110 have agreed upon parameters for a VPN tunnel that extends between the two devices. The establishment of this VPN tunnel involves mobile node 102 communicating over private network 104, NAT device 106, and public network 108 with home agent 110 at home agent 110's public IP address. Mobile node 102 and home agent 110 may thereafter exchange encrypted packets inside this VPN tunnel. Also as part of step 502, home agent 110 has assigned mobile node 102 a public IP address.

b. Registering the Mobile Node with the Home Agent

At step 504, mobile node 102 is registered with home agent 110. Step 504 involves mobile node 102 communicating via the VPN tunnel that was established in step 502 with home agent 110 at the home agent's public IP address. Step 504 also involves establishing the public address that home agent 110 assigned to mobile node 102 in step 502 as a home address for mobile node 102 for purposes of, as one example, Mobile-IP communication.

As such, step 504 may include mobile node 102 conducting a Mobile-IP registration. As part of this Mobile-IP registration, mobile node 102 may transmit a Mobile-IP registration request to home agent 110 inside the VPN tunnel. As mentioned above, mobile node 102 may be operating in what is known as "co-location mode," wherein mobile node 102 does not wait for agent advertisement messages from a Mobile-IP foreign agent; rather, mobile node 102 proactively contacts its home agent in order to conduct the registration process. Mobile node 102 may indicate to home agent 110 that mobile node 102 is operating in this mode by setting one or more bits in the registration request to particular values.

Mobile node 102 may thus format the Mobile-IP registration request to have (i) a source IP address equal to the public IP address assigned by home agent 110 to mobile node 102 in step 502, and a (ii) destination address equal to the public IP address of home agent 110. The registration request may include a "home address" field that mobile node 102 may set to 0.0.0.0, to indicate to home agent 110 that mobile node 102 is requesting the assignment of a home address. The registration request may further include a "care-of address" field, that mobile node 102 may set equal to its private IP address on private network 104. The registration request may also include different values for those data fields, may not include those data fields at all, and may include additional data fields as well.

Mobile node 102 may then encrypt that registration request according to the agreed-upon parameters of the VPN tunnel, and add a transport-protocol header and an outer IP header to the encrypted registration request, as described above. For illustration, UDP will be used as an exemplary transport protocol. Mobile node 102 may set a source port in the UDP header equal to a first value and set a source IP address in the outer header equal to mobile node 102's private IP address on private network 104. Mobile node 102 may then set a destination IP address of the outer header equal to home agent 110's public IP address. Mobile node 102 may then transmit that assembled packet over private network 104 to NAT device 106.

Upon receipt of the packet from mobile node 102, NAT device 106 may modify the source port to be equal to a second value chosen, perhaps randomly, by NAT device 106. NAT device 106 may also modify the source IP address to be equal to the NAT-device 106's public IP address on public network 108. NAT device 106 may then transmit the packet over public network 108 to home agent 110.

Upon receipt of the now-modified packet from NAT device 106, home agent 110 may receive the packet, strip off the outer IP header and the UDP header, storing at least the source IP address and source UDP port of that modified packet for later use. Home agent 110 may then decrypt and then process the registration request. The processing may include storing an association—known as a mobility binding—between mobile node 102's home address and the public IP address of NAT device 106. As part of this process, home agent 110 may recognize that the care-of address in the registration request (set to mobile node 102's private IP address on private network 104) does not match the source IP address of the outer IP header. Home agent 110 may conclude from this mismatch that at least one NAT device resides on the communication path between home agent 110 and mobile node 102.

Home agent 110 may then generate a Mobile-IP registration reply having a source address equal to the home agent 110's public IP address and a destination address equal to the public IP address that home agent 110 had assigned to mobile node 102 during step 502, and that was specified by mobile node 102 in the source address of the registration request. Home agent 110 may also set a home address field of the registration reply equal to that same address.

Home agent 110 may then encrypt the packet according to the VPN tunnel, add a UDP header having destination port equal to the source-port value of the UDP header that was associated with the registration request, and add an outer IP header having a source address equal to the public address of home agent 110 and a destination address equal to the public address of NAT device 106. Home agent 110 may then transmit the assembled packet over public network 108 to NAT device 106.

Upon receipt of the packet, NAT device 106 may change the UDP destination port to be equal to the value used by the mobile node 102 when sending the registration request. NAT device 106 may also modify the destination address of the outer IP header to be equal to the private address of mobile node 102 on private network 104. NAT device 106 may then transmit the modified packet over private network 104 to mobile node 102.

Upon receipt of that modified packet, mobile node 102 may strip off the outer IP header and the UDP header, and process the registration reply. This processing may include mobile node 102 setting it's home address for Mobile-IP purposes equal to the public address assigned by home agent 110 to mobile node 102 as part of step 502, that address also possibly having been specified in the home address field of the registration reply.

c. Ensuing Packet-Data Communication

Mobile node 102 is now registered for Mobile-IP purposes with home agent 110, and can engage in Mobile-IP communication with or via home agent 110 in a secure and private manner, inside the established VPN tunnel. As an example, mobile node 102 may conduct a VoIP call via the VPN tunnel.

Because mobile node 102 need not include separate headers in the VoIP packets addressed from the mobile node to a VPN server and from the mobile node to a Mobile-IP home agent, mobile node 102 can include more voice data in each VoIP packet and thus engage in a higher quality VoIP session.

For illustration, mobile node 102 will now be described sending one packet and receiving one packet. It should be apparent, however, that, in operation, mobile node 102 could and likely would transmit and receive numerous packets. Furthermore, the described sequences of packet addressing, transmission, and modification are in no way limited to the VoIP context. These packets could be HTTP requests and responses, SIP requests and responses, and/or any other type of packet-data transmission.

To begin, mobile node 102 transmits an outbound packet to NAT device 106 via private network 104. That outbound packet comprises (i) an outbound inner packet having some amount of user data, as well as a source address equal to mobile node 102's home address, and is encrypted according to the VPN tunnel, (ii) an outbound transport header having a source port equal to a first value, and (iii) an outbound outer header having (a) a source address equal to mobile node 102's private address on private network 104 and (b) a destination address equal to home agent 110's public address.

NAT device 106 receives the outbound packet from mobile node 102 via private network 104 and responsively (i) provides a modified outbound packet by (a) changing the source port of the outbound transport header to a second value and (b) changing the source address of the outbound outer header to NAT device 106's public address and (ii) forwards the modified outbound packet to home agent 110 via public network 108.

Home agent 110 receives the modified outbound packet from NAT device 106 via public network 108 and responsively (i) removes the outbound outer header and the outbound transport header from the modified outbound packet, (ii) decrypts the encrypted outbound inner packet according to the VPN tunnel, and (iii) processes the outbound inner packet. The outbound inner packet may include a destination address of a node with which mobile node 102 is corresponding. Thus, home agent 110 processing the outbound inner packet may involve home agent 110 forwarding the outbound inner packet to that corresponding node. Home agent 110 may use one or more tags to mark packets as being associated with particular VPN tunnels.

As one example, the corresponding node may reside on public network 108. In that case, the destination address of the corresponding node would be a public address routable on public network 108. Further to this example, the corresponding node could be web server 122 of FIG. 1, in which case the outbound inner packet may include an HTTP request.

As another example, the corresponding node could reside on provider network 114 and have a private address routable on that network. As examples, the corresponding node could be SIP server 116, RTP server 118, or WAP gateway 120. In these cases, the outbound inner packet could include content appropriate to the type of device to which the packet is sent, such as a SIP request, an RTP packet, an HTTP request that may be modified by WAP gateway 120, etc.

The corresponding node may then receive the packet, which, again, would have a source address equal to the mobile node 102's home address and a destination address equal to the corresponding node's address. Thus, based on those facts alone, the corresponding node would have no idea where mobile node 102 is located or to what network or type of network mobile node 102 is attached. The corresponding node may then format a response referred to here as an "inbound inner packet" due to its later encapsulation. The corresponding node would format the inbound inner packet to have a source address equal to the corresponding node's (private or public) address and a destination address equal to the mobile node's home address. The corresponding node may then transmit the inbound inner packet to home agent 110.

Home agent 110 then receives the inbound inner packet from the corresponding node, determines that the inbound inner packet has a destination address equal to mobile node 102's home address, and responsively (i) encrypts the inbound inner packet according to the VPN tunnel, (ii) generates an "inbound packet" by adding an inbound transport header and an inbound outer header to the encrypted inbound inner packet, and (iii) forwards the inbound packet to NAT device 106 via the public network. The inbound transport header would have a destination port equal to the second value (chosen previously by NAT device 106). The inbound outer header would have a source address equal to the public IP address of home agent 110 and a destination address equal to the public IP address of NAT device 106.

NAT device 106 then receives the inbound packet from home agent 110 via public network 108 and responsively (i) provides a modified inbound packet by (a) changing the destination address of the inbound outer header to the mobile node 102's private IP address on private network 104 and (b) changing the destination port of the inbound transport header to the first value (set earlier by mobile node 102) and (ii) forwards the modified inbound packet to mobile node 102 via private network 104.

Mobile node 102 then receives the modified inbound packet from NAT device 106 via private network 104 and responsively (i) removes the inbound outer header and the inbound transport header from the modified inbound packet, (ii) decrypts the inbound inner packet according to the VPN tunnel, and (iii) processes the inner inbound packet, perhaps by passing that inbound inner packet to an application such as a VoIP application or web browser.

3. Conclusion

Various exemplary embodiments have been described above. Those skilled in the art will understand, however, that changes and modifications may be made to those examples without departing from the scope of the claims.

The invention claimed is:

1. A system comprising:
a multi-mode device; and
a Mobile Internet Protocol (Mobile IP) home agent having a public IP address, wherein the Mobile IP home agent comprises a virtual-private-network (VPN) function co-located at the public IP address;
wherein the multi-mode device communicates with the Mobile IP home agent at the Mobile IP home agent's public IP address to establish a VPN tunnel extending between the multi-mode device and the Mobile IP home agent, wherein the multi-mode device receives from the Mobile IP home agent an assignment of a given public IP address for the multi-mode device to use in communicating with the Mobile IP home agent via the VPN tunnel;
wherein the multi-mode device thereafter conducts a Mobile IP registration with the Mobile IP home agent via the VPN tunnel, including (i) sending to the Mobile IP home agent via the VPN tunnel a Mobile IP registration request having a source IP address equal to the given public IP address that the Mobile IP home agent had assigned to the multi-mode device to use in communicating with the Mobile IP home agent via the VPN tunnel, and (ii) receiving from the Mobile IP home agent via the VPN tunnel a Mobile IP registration reply having a destination IP address equal to the given public IP address that the Mobile IP home agent had assigned to the multi-mode device to use in communicating with the Mobile IP home agent via the VPN tunnel, the received Mobile IP registration reply further specifying as a Mobile IP home address of the multi-mode device the same given public IP address, established as the Mobile IP home address for the multi-mode device; and wherein the multi-mode device thereafter exchanges encrypted packets with the Mobile IP home agent inside the VPN tunnel, wherein the encrypted packets do not include separate IP headers for (i) the VPN tunnel and (ii) Mobile IP communication.

2. The system of claim 1, wherein the multi-mode device is arranged to be able to communicate with at least one wireless wide area network (WWAN) and at least one wireless local area network (WLAN).

3. The system of claim 1, wherein establishing the VPN tunnel comprises the multi-mode device:
transmitting an Internet Key Exchange (IKE) request to the Mobile IP home agent; and
receiving an IKE response from the Mobile IP home agent, wherein the IKE response comprises the given public IP home address for the multi-mode device.

4. The system of claim 1, wherein the multi-mode device resides on a private wireless network behind a network address translation (NAT) device.

5. The system of claim 4, wherein the multi-mode device communicates with the NAT device according to a wireless protocol selected from the group consisting of Institute of Electrical and Electronics Engineers (IEEE) 802.11, Bluetooth, HiperLAN, Multichannel Multipoint Distribution Service (MMDS), and HomeRF.

6. The system of claim 4, wherein the multi-mode device:
transmits a Dynamic Host Configuration Protocol (DHCP) request to the NAT device via the private wireless network; and
receives a DHCP response from the NAT device via the private wireless network, wherein the DHCP response comprises a private IP address for the multi-mode device to use for communication over the private wireless network.

7. The system of claim 4, wherein:
the multi-mode device transmits an outbound packet to the NAT device via the private wireless network, wherein the outbound packet comprises (i) an outbound inner packet having a source address equal to the Mobile IP home address for the multi-mode device, wherein the outbound inner packet is encrypted according to the VPN tunnel, (ii) an outbound transport header having a source port equal to a first value, and (iii) an outbound outer header having (a) a source address equal to a private IP address of the multi-mode device on the private wireless network and (b) a destination address equal to the Mobile IP home agent's public address; and
the NAT device receives the outbound packet from the multi-mode device via the private wireless network and responsively (i) provides a modified outbound packet by (a) changing the source port of the outbound transport header to a second value and (b) changing the source address of the outbound outer header to a public address of the NAT device and (ii) forwards the modified outbound packet to the Mobile IP home agent via a public network.

8. The system of claim 7, wherein:
the NAT device receives an inbound packet from the Mobile IP home agent via the public network, wherein the inbound packet has (a) an inbound outer header having a destination address equal to the NAT device's public address and (b) an inbound transport header having a destination port equal to the second value, and responsively (i) provides a modified inbound packet by (a) changing the destination address of the inbound outer header to the multi-mode device's private address and (b) changing the destination port of the inbound transport header to the first value and (ii) forwards the modified inbound packet to the multi-mode device via the private wireless network; and
the multi-mode device receives the modified inbound packet from the NAT device via the private wireless network, wherein the modified inbound packet further comprises an inbound inner packet having a destination address equal to the Mobile IP home address for the multi-mode device, and wherein the inbound inner packet is encrypted according to the VPN tunnel, and responsively (i) removes the inbound outer header and the inbound transport header from the modified inbound packet, (ii) decrypts the inbound inner packet according to the VPN tunnel, and (iii) processes the inner inbound packet.

9. The system of claim 8, wherein the Mobile IP home agent:
receives the modified outbound packet from the NAT device via the public network and responsively (i) removes the outbound outer header and the outbound transport header from the modified outbound packet, (ii) decrypts the encrypted outbound inner packet according to the VPN tunnel, and (iii) processes the outbound inner packet; and
receives the inbound inner packet from a corresponding node, determines that the inbound inner packet has a destination address equal to the Mobile IP home address for the multi-mode device, and responsively (i) encrypts the inbound inner packet according to the VPN tunnel, (ii) generates the inbound packet by adding the inbound transport header and inbound outer header to the encrypted inbound inner packet, and (iii) forwards the inbound packet to the NAT device via the public network.

10. The system of claim 9, wherein at least one of the transport headers is a User Datagram Protocol (UDP) header or a Transport Control Protocol (TCP) header.

11. The system of claim 9, wherein at least one of the packets is an IP packet and at least one of the addresses is an IP address.

12. The system of claim 11, wherein at least one of the packets relates to at least part of a Voice over Internet Protocol (VoIP) session.

13. The system of claim 9, wherein the outbound inner packet further comprises a destination address of the corresponding node, and wherein the Mobile IP home agent processing the outbound inner packet comprises the Mobile IP home agent forwarding the outbound inner packet to the corresponding node.

14. The system of claim 13, wherein the inbound inner packet has a source address equal to the destination address of the outbound inner packet.

15. The system of claim 13, wherein the corresponding node resides on the public network, and wherein the destination address of the corresponding node is a public address.

16. The system of claim 13, wherein the Mobile IP home agent resides on both the public network and a third network, and wherein the destination address of the corresponding node is routable on the third network.

17. The system of claim 16, wherein the corresponding node is a device selected from the group consisting of a Session Initiation Protocol (SIP) server, a Real-time Transport Protocol (RTP) server, and a Wireless Application Protocol (WAP) gateway.

18. A multi-mode device comprising:
a communication interface arranged to be able to communicate with at least one wireless wide area network (WWAN) and at least one wireless local area network (WLAN);
a processor; and
data storage containing program instructions executable by the processor to:
establish a virtual-private-network (VPN) tunnel extending between the multi-mode device and a Mobile Internet Protocol (Mobile IP) home agent, wherein establishing the VPN tunnel comprises communicating with the Mobile IP home agent at a public IP address of the Mobile IP home agent, wherein the Mobile IP home agent comprises a VPN function co-located at the Mobile IP home agent's public IP address, and wherein the multi-mode device receives from the Mobile IP home agent an assignment of a given public IP address for the multi-mode device to use in communicating with the Mobile IP home agent via the VPN tunnel;
conduct a Mobile IP registration with the Mobile IP home agent via the VPN tunnel, wherein conducting the Mobile IP registration with the Mobile IP home agent via the VPN tunnel includes (i) sending to the Mobile IP home agent via the VPN tunnel a Mobile IP registration request having a source IP address equal to the given public IP address that the Mobile IP home agent had assigned to the multi-mode device to use in communicating with the Mobile IP home agent via the VPN tunnel, and (ii) receiving from the Mobile IP home agent via the VPN tunnel a Mobile IP registration reply having a destination IP address equal to the given public IP address that the Mobile IP home agent had assigned to the multi-mode device to use in communicating with the Mobile IP home agent via the VPN tunnel, the received Mobile IP registration reply further specifying as a Mobile IP home address of the multi-mode device the same given public IP address, established as the Mobile IP home address for the multi-mode device; and
exchange encrypted packets with the Mobile IP home agent inside the VPN tunnel, wherein the encrypted packets do not include separate IP headers for (i) the VPN tunnel and (ii) Mobile IP communication.

19. A Mobile IP home agent comprising:
a communication interface associated with a public Internet Protocol (IP) address of the Mobile IP home agent;
a virtual-private-network (VPN) function co-located at the public IP address of the Mobile IP home agent;
a processor; and
data storage containing program instructions executable by the processor to:
establish a VPN tunnel extending between a multi-mode device and the Mobile IP home agent, wherein establishing the VPN tunnel comprises assigning the multi-mode device a given public IP address for the multi-mode device to use in communicating with the Mobile IP home agent via the VPN tunnel;
conduct a Mobile IP registration for the multi-mode device via the VPN tunnel, wherein conducting the Mobile IP registration for the multi-mode device via the VPN tunnel includes (i) receiving from the multi-mode device via the VPN tunnel a Mobile IP registration request having a source IP address equal to the given public IP address that the Mobile IP home agent had assigned to the multi-mode device to use in communicating with the Mobile IP home agent via the VPN tunnel, and (ii) sending to the multi-mode device via the VPN tunnel a Mobile IP registration reply having a destination IP address equal to the given public IP address that the Mobile IP home agent had assigned to the multi-mode device to use in communicating with the Mobile IP home agent via the VPN tunnel, the sent Mobile IP registration reply further specifying as a Mobile IP home address of the multi-mode device the same given public IP address, established as the Mobile IP home address for the multi-mode device; and
exchange encrypted packets with the multi-mode device inside the VPN tunnel, wherein the encrypted packets do not include separate IP headers for (i) the VPN tunnel and (ii) Mobile IP communication.

\* \* \* \* \*